US006627298B2

United States Patent
Koyama et al.

(10) Patent No.: US 6,627,298 B2
(45) Date of Patent: Sep. 30, 2003

(54) SUPPORT AND THERMAL TRANSFER IMAGE-RECORDING MATERIAL

(75) Inventors: Hiroshi Koyama, Kashima-gun (JP); Akihiko Ohno, Kashima-gun (JP); Tamio Shikano, Kashima-gun (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 09/842,978

(22) Filed: Apr. 27, 2001

(65) Prior Publication Data

US 2002/0039640 A1 Apr. 4, 2002

Related U.S. Application Data

(63) Continuation of application No. PCT/JP99/05935, filed on Oct. 27, 1999.

(30) Foreign Application Priority Data

Oct. 27, 1998 (JP) ............................................. 10-305537

(51) Int. Cl.[7] ............................................... B41M 5/40
(52) U.S. Cl. ....................................................... 428/195
(58) Field of Search ................................. 428/195, 212, 428/910, 913, 914

(56) References Cited

FOREIGN PATENT DOCUMENTS

| EP | 0 630 759 | 12/1994 |
|---|---|---|
| JP | 7-61154 | 3/1995 |
| JP | 7-76186 | 3/1995 |
| JP | 7-137469 | 5/1995 |
| JP | WO 00/24579 | 5/2000 |

*Primary Examiner*—Bruce H. Hess
(74) *Attorney, Agent, or Firm*—Oblon, Spivak, McClelland, Maier & Neustadt, P.C.

(57) ABSTRACT

A support which contains a base layer (B) composed of a biaxially stretched film of a thermoplastic resin containing an inorganic fine powder; and a surface layer (A) provided at least on one side of such base layer (B), which is composed of a biaxially stretched film of a thermoplastic resin having a three dimensional center plane average roughness of about 0.3 $\mu$m or below and a 60 degrees surface glossiness of about 80% or above is disclosed. A thermal transfer image-recording material using such support can produce a clear image having an excellent glossiness and no external waviness.

35 Claims, 2 Drawing Sheets

SUPPORT AND THERMAL TRANSFER IMAGE-RECORDING MATERIAL

This application is a continuation of application Ser. No. PCT/JP99/05935 filed Oct. 27, 1999.

BACKGROUND OF THE INVENTION

1. Field of the Invention

The present invention relates to a support preferably used for a thermal transfer image-recording material. The present invention also relates to a thermal transfer image-recording material which is excellent in glossiness, low in surface roughness and capable of producing a clear image. The present invention further relates to a thermal transfer image-recording material capable of sensitively producing an image with a high color density even at a lower thermal energy during printing.

DESCRIPTION OF THE BACKGROUND

Image production based on thermal transfer recording is generally effected by heating an ink ribbon containing a color material layer and a base supporting thereof, subliming or vaporizing dye included in such color material layer, and allowing such liberated dye to be fixed into a thermal transfer image-recording material.

Figure 1:
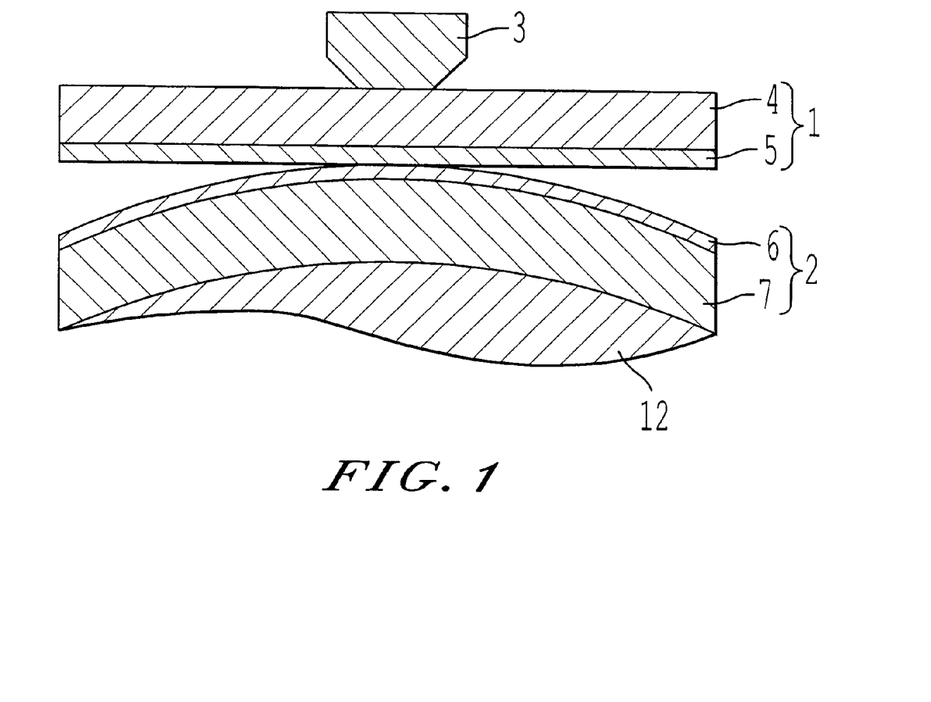
FIG. 1 is a schematic sectional view depicting a thermal transfer recording process.

More specifically as shown in FIG. 1, an ink ribbon 1 composed of a color material layer 5 which contains a sublimable or vaporizable dye and a base 4 supporting thereof is press-contacted with a thermal transfer image-recording recording material 2 composed of a thermal transfer image-recording layer 6 and a support 7 supporting thereof, between a drum 12 and a heat source 3 (thermal head, for example) which is controllable with electric signals, in which the color material layer 5 is heated by the heat source 3 to thereby allow the dye contained therein to sublime or vaporize and then to be fixed into the thermal transfer image-recording layer 6 of the thermal transfer image-recording material 2, which leads to the image production based on thermal transfer recording.

The support 7 of the thermal transfer image-recording material 2 is generally composed of pulp paper; opaque synthetic paper containing a stretched propylene-base resin film containing an inorganic fine powder (as disclosed in Examined Japanese Patent Publication 46-40794); or synthetic coated paper composed of a transparent polyethylene terephthalate film or transparent polyolefin-base resin film with an improved whiteness and dye fixing property attained by coating thereon an inorganic fine powder such as silica or calcium carbonate together with a binder.

Among these, a synthetic paper obtained by stretching a polyolefin resin film containing inorganic fine powder is acceptable since such paper having a lot of internal micro-voids is excellent in strength, dimensional stability, contact property with a printing head, copying property after thermal transfer printing, writing property with a pencil and in storability (as disclosed in Laid-Open Japanese Patent Publications Nos. 60-245593, 61-112693 and 63-193836). Such types of synthetic paper are stretched at a temperature lower than the melting point of the polyolefin-base resin to thereby form the internal micro-voids, in order to achieve desirable softness, opacity, contact property with a printing head, and paper feed/discharge property. While such synthetic paper has a number of excellent properties, recent trends need a thermal transfer image-recording material capable of producing an image with a higher glossiness. In particular, most preferable is capability in producing a high-density image even under high-speed printing conditions.

One proposal for increasing the glossiness relates to a synthetic paper having on the surface of a support a film layer substantially containing no inorganic filler. This synthetic paper, however, still suffers from degraded glossiness of image obtained by thermal transfer printing since the support has a surface roughness due to subtle external waviness.

In an attempt to address this problem, a thermal transfer image-recording material having less surface roughness enough for providing a clear image has also been provided (Laid-Open Japanese Patent Publication 7-179078).

However, more recently thermal transfer image-recording materials having a still higher level of surface glossiness have been required. Thus, there is a strong need for a practical thermal transfer image-recording material on which the user can visually recognize a high glossiness.

SUMMARY OF THE INVENTION

Accordingly, it is an object of the present invention to provide a thermal transfer image-recording material having a reduced surface roughness due to external waviness with very high glossiness. In particular, the present invention provides a practical thermal transfer image-recording material on which the user can visually recognize a high glossiness.

It is still another object of the present invention to provide a support containing such a thermal transfer image-recording material.

The above objects and others are provided by a support, containing:

a) a base layer (B) containing a biaxially stretched film of a thermoplastic resin containing an inorganic fine powder; and b) a surface layer (A) provided at least on one side of the base layer (B), which is composed of a biaxially stretched film of a thermoplastic resin having a three-dimensional center plane average roughness of 0.3 $\mu$m or below and a 60 degrees surface glossiness of 80% or above.

BRIEF DESCRIPTION OF THE DRAWINGS

In FIGS. 1 and 2, reference numeral 1 is used for a thermal transfer ink ribbon, 2 for a thermal transfer image-recording material, 3 for a heat source, 4 for a base, 5 for a color material layer, 6 for a thermal transfer image-recording layer, 7 for a support, 8 for a surface layer, 9 for a base layer, 10 for a back layer, 11 for a backing layer and 12 for a drum.

DETAILED DESCRIPTION OF THE PREFERRED EMBODIMENTS

The present inventors have now surprisingly discovered that a thermal transfer image-recording material on which the user can visually recognize a high glossiness must satisfy two conditions, which are, that the material should have a high 60 degrees surface glossiness, and should also have a three-dimensional center plane average roughness within a predetermined range of values.

That is, the present invention provides a support containing a base layer (B) composed of a biaxially stretched film of a thermoplastic resin containing an inorganic fine powder; and a surface layer (A) provided at least on one side of said base layer (B), which is composed of a biaxially stretched film of a thermoplastic resin having a three dimensional center plane average roughness of 0.3 μm or below and a 60 degrees surface glossiness of about 80% or above.

Preferable embodiments of the present invention include those where the surface layer (A) contains a biaxially stretched film of a thermoplastic resin having a three-dimensional center plane average roughness of about 0.3 μm or below and a 20 degrees surface glossiness of about 30% or above; such that the three-dimensional center plane average roughness is within a range from about 0.05 to 0.2 μm; such that the surface layer (A) contains about 1 to 10 wt % of titanium dioxide fine powder; such that the titanium dioxide fine powder has the rutile structure; such that the titanium dioxide fine powder has an average grain size of about 0.5 μm or below; such that the base layer (B) is composed of a biaxially stretched film of a thermoplastic resin containing about 5 to 45 wt % of an inorganic fine powder; such that the inorganic fine powder has an average grain size of about 3 μm or below; such that the inorganic fine powder is calcium carbonate powder having a specific surface area of about 20,000 cm$^2$/g or above, and excluding grains with a grain size of about 10 μm or above; such that the thermoplastic resin is a polyolefin-base resin; such that the polyolefin-base resin is at least one selected from the group consisting of propylene homopolymer, ethylene-propylene random copolymer, and ethylene-propylene-1-butene random copolymer; such that further comprising a back layer (C) provided on the base layer (B) on the side opposite to the surface layer (A); such that obtained by biaxially stretching a stacked material composed of at least the base layer (B) and such surface layer (A) stacked thereon; such that a stretching factor of such biaxial stretching is 3- to 8-fold in the longitudinal direction and 3- to 12-fold in the transverse direction; such that having a total thickness of about 30 to 300 μm; such that the surface layer (A) has a thickness of about 1.5 μm or above; such that the thickness of such surface layer (A) is less than about 15% of the total thickness of the support; and such that having a porosity of about 20 to 60%.

The present invention also provides a thermal transfer image-recording material comprising the foregoing support. The thermal transfer image-recording material of the present invention preferably has a thermal transfer image-recording layer on such surface layer (A).

The support and the thermal transfer image-recording material of the present invention will now be described in more detail.

Support

The support of the present invention have the surface layer (A) on one side or on both sides of the base layer (B). The surface layer contains a biaxially stretched film of a thermoplastic resin. The base layer (B) contain a biaxially stretched film of a thermoplastic resin containing an inorganic fine powder.

There is no special limitation on the species of the thermoplastic resin used for the surface layer (A) and base layer (B).

Examples of such thermoplastic resin include polyolefinic resins; polyamide resins such as 6-nylon, and 6,6-nylon; thermoplastic polyester resins such as polyethylene terephthalate and copolymers thereof, polybutylene terephthalate and copolymers thereof, and aliphatic polyester; polycarbonate; atactic polystyrene; and syndiotactic polystyrene.

Among these, non-polar polyolefinic resins are preferably used. Possible examples of the polyolefinic resins include homopolymer of $C_{2-8}$ a-olefins such as ethylene, propylene, 1-butene, 1-hexene, 1-heptene, 1-octene, 4-methyl-1-pentene and 3-methyl-1-pentene; and copolymers of 2 to 5 species selected from such a-olefins. Either random copolymer or block copolymer is allowable. More specifically, allowable are branched or normal polyethylene having a density of 0.89 to 0.97 g/cm$^3$ and a melt flow rate (190° C., 2.16 kg load) of 1 to 10 g //10 minutes; and polymers having a melt flow rate (230° C., 2.16 kg load) of 0.2 to 8 g//10 minutes such as propylene homopolymer, propylene-ethylene copolymer, propylene-(1-butene) copolymer, propylene-ethylene-(1-butene) copolymer, propylene-(4-methyl-1-pentene) copolymer, propylene-(3-methyl-1-pentene) copolymer, poly(1-butene), poly(4-methyl-1-pentene) and propylene-ethylene-(3-methyl-1-pentene) copolymer. Among these, propylene homopolymer; ethylene-propylene random copolymer having an ethylene content of 0.5 to 8 wt %; ethylene-propylene-1-butene random copolymer having an ethylene content of 0.5 to 8 wt %, an 1-butene content of 4 to 12 wt % and a propylene content of 80 to 95.5 wt %; and high-density polyethylene are preferable in terms of inexpensiveness and formability.

A single thermoplastic resin may be selected from the above for use respectively in the surface layer (A) and the base layer (B), or two or more thermoplastic resins selected therefrom may properly be combined. Either the same species or different species of the thermoplastic resin can be used for the surface layer (A) and base layer (B). Species of the thermoplastic resins can properly be selected depending on specific properties required for the individual layers.

There is no special limitation on the species of the inorganic or organic fine powder used for the base layer (B). Examples of the inorganic fine powder include calcium carbonate, fired clay, diatomaceous earth, talc, titanium oxide, barium sulfate, aluminum sulfate and silica. It is also acceptable to mix two or more inorganic fine powders. To regulate three-dimensional center plane average roughness (SRa) as low as 0.3 μm or below, the base layer (B) preferably contains an inorganic fine powder having an average grain size of 3.0 μm or below.

In relation to provide a thermal transfer image-recording material on which the user can visually recognize a high glossiness, one major characteristic of the present invention resides in that raising a 60 degrees surface glossiness. The phrase "a 60 degrees surface glossiness" in the context of this specification means a glossiness obtained by a test defined in JIS P-8142 "Testing method for 75 degrees specular glossiness of paper and board" except that employing an incident angle of probe light of 60 degrees in place of 75 degrees. More specifically, a 60 degrees surface glossiness is set to 80% or above in the present invention.

In particular, a 20 degrees surface glossiness of 30% or above is more preferable. Now the phrase "a 20 degrees surface glossiness" in the context of this specification means a glossiness obtained by a test defined in JIS P-8142 except that modifying an incident angle to 20 degrees.

The case with an incident angle of 60 or 20 degrees, smaller than 75 degrees, requires an approach for improving the glossiness, which may be different from an approach with an incident angle of 75 degrees. The present inventors thoroughly investigated into means for effectively improving the surface glossiness at a low incident angle, and discovered that not only enhancing reflection on the surface of the surface layer (A), but also suppressing scattering of the light, coming through the surface layer (A), at the boundary with the base layer (B) and enhancing secondary reflection instead. The present inventors also found that desirable result can be obtained if the micro-voids in the base layer (B) are formed in a constant small size. Forming such micro-voids can improve a cushion effect of the support, to thereby improve contact property of the thermal transfer image-recording material with a thermal head and produce an image with a higher density.

Such desirable micro-voids can be formed by stretching a resin composition containing an inorganic fine powder and a thermoplastic resin. It is quite effective to use for the base layer (B) an inorganic fine powder having a specific surface area of about 20,000 $cm^2/g$ or above, and excluding grains with a grain size of about 10 μm or above. Using the inorganic fine powder excluding grains with a grain size of about 5 μm or above is more preferable. In particular, using calcium carbonate powder having such sharp grain size distribution as defined above is preferable. It should now be noted that the inorganic fine powder for use in the base layer (B) is by no means limited to those meeting such requirements.

The amount of the inorganic fine powder to be contained in the base layer (B) is preferably about 5 to 45 wt %, and more preferably about 10 to 30 wt %.

It is both allowable for the surface layer (A) to contain and not contain the inorganic fine powder. That is, the surface layer (A) may be composed solely of a resin film containing no inorganic powder or of a resin film added as needed with the inorganic fine powder. For the case the surface layer (A) contains the inorganic powder, the same one as described in the above is applicable. It is, however, not always necessary for the surface layer (A) to contain an inorganic fine powder same as that in the base layer (B), wherein the species and grain size thereof may differ. An amount of the inorganic fine powder contained in the surface layer (A) is 0 to 10 wt %, and more preferably 0 to 8 wt %.

In the present invention, it is preferable to include titanium dioxide fine powder to the surface layer (A) in an amount of about 1 to 10 wt %, and more preferably about 1 to 8 wt %. While there is no special limitation on the physical properties of titanium dioxide to be used, such that having the rutile structure is preferably used. The average grain size of titanium dioxide is preferably about 0.5 μm or below, more preferably about 0.3 μm or below, and still more preferably about 0.2 μm or below. Incorporating titanium dioxide into the surface layer (A) according to the present invention will result in a thermal transfer image-recording material capable of developing an enhanced color density in the half tone region. In particular, such effect will be eminent if a 20 degrees surface glossiness is about 30% or above.

The support of the present invention may be composed not only of the surface layer (A) and the base layer (B), but also of a back layer (C). The back layer (C) may be composed of a resin film containing no inorganic fine powder or of a resin film containing as needed an inorganic fine powder. For the case the back layer (C) contains the inorganic powder, the same one as contained in the base layer (B), described in the above, is applicable. The amount of use of such inorganic fine powder is preferably 0 to 45 wt %. The resin film is preferably a biaxially stretched film of polypropylene-base resin.

The support of the present invention may have a backing layer, adhesive layer, undercoat layer, cushion layer or the like. These layers can be formed in consideration of purposes and environment of use of the support. Also materials used therefor can properly be selected depending on the target functions. For example, pulp paper, transparent or white opaque polyethylene terephthalate film, and so forth can be available for the backing layer.

Figure 2:
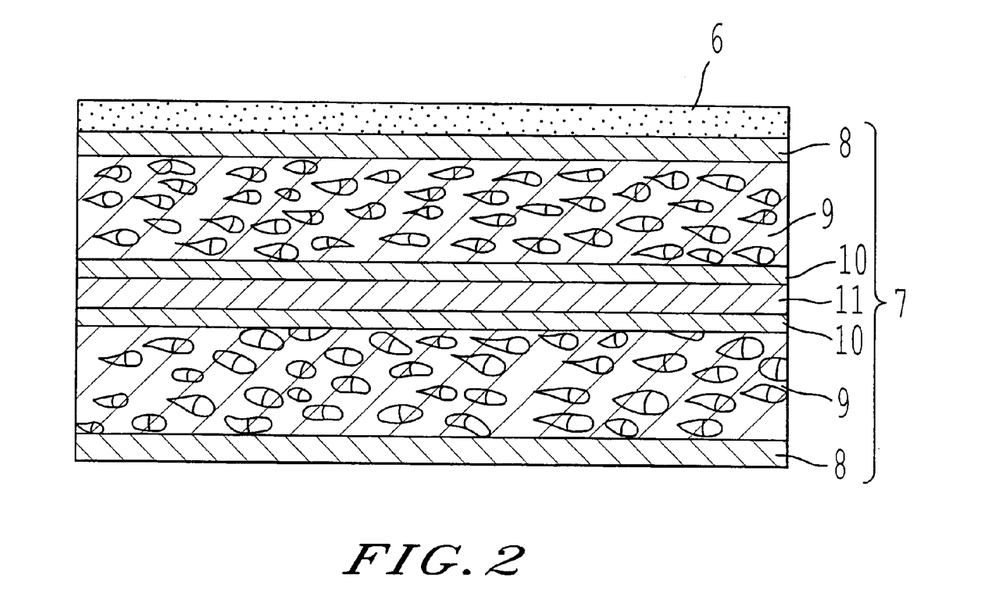
FIG. 2 is a schematic sectional view showing a thermal transfer image-recording material of the present invention.

Constitution of the support of the present invention is not specifically limited so far as having the surface layer (A) and the base layer (B). A typical constitution of the support can be expressed as surface layer (A)/base layer (B)/back layer (C). Also exemplified is a constitution in which two sets of such three-layered materials are stacked so that the individual back layers (C) are opposed while being interposed with a backing layer. That is, as shown in FIG. 2, the support will have a seven-layered structure such as surface layer (A)/base layer (B)/back layer (C)/backing layer/back layer (C)/base layer (B)/surface layer (A). Another possible example of the seven-layered structure has an altered stacking order of the layers such as surface layer (A)/base layer (B)/back layer (C)/backing layer/surface layer (A)/base layer (B)/back layer (C). An adhesive layer is properly be interposed between any layers.

The support of the present invention can be fabricated by any process or processes known to those skilled in the art. Thus, any support obtained by any such process or processes are contemplated as being within the scope of the present invention as long as the base layer (B) and the surface layer (A) are as defined broadly above.

One typical process for fabricating the support of the present invention starts with mixing materials composing the individual layers. For example, a composition for forming the base layer (B) can be obtained by mixing an inorganic fine powder and a thermoplastic resin. It is now also allowable to optionally add a dispersant, antioxidant, solubilizing agent, ultraviolet stabilizer or the like. Thus compounded and kneaded materials for the individual layers can be formed into a laminar form by, for example, extrusion. The individual layers may be stacked en bloc by co-extrusion, or may be stacked after being separately extruded. For the case of stacking after separate extrusion, for example, the back layer (C) can be stacked on the base layer (B) having the surface layer (A) already stacked thereon, or the surface layer (A) can be stacked on the base layer (B) having the back layer (C) already stacked thereon. Or, it is also allowable to co-extrude the surface layer (A) and the base layer (B) and then stack thereon the back layer (C), or to co-extrude the base layer (B) and the back layer (C) and then stack thereon the surface layer (A).

Biaxial stretching is indispensable for fabricating the support of the present invention. The biaxial stretching can be carried out either before or after the stacking. That is, previously stretched films can be stacked, or unstretched films are stacked and then stretched en bloc. It is also acceptable to stack previously stretched films and to stretch the stack again. A preferable fabrication process includes the steps for stacking the surface layer (A), base layer (B) and back layer (C), and then biaxially stretching these layers en bloc. Such process is more simple and less expensive as compared with the process of separate stretching and the successive stacking.

A variety of known methods are applicable to the stretching. For the case using a non-crystalline thermoplastic resin, the stretching temperature can be set at a temperature equal to or higher than a glass transition point thereof; and, for the case using a crystalline thermoplastic resin, can be set within a temperature range from a glass transition point of the amorphous domain to the melting point of the crystalline domain, both ends inclusive. It is preferable that the co-extruded stack is once cooled to a temperature lower by 30 to 100° C. than the melting point of a thermoplastic resin prior to the stretching, and then re-heat the stack up to a temperature around the melting point.

Methods for effecting the stretching are not subject to any particular limitation. Simultaneous stretching in the longitudinal and transverse directions, or longitudinal stretching followed by transverse stretching is acceptable. Specific examples of the stretching method include inter-roll stretching based on difference in the peripheral speeds between the roll groups, and stretching using a tenter, while being not limited thereto. There is no limitation also on the factor of stretching, and the biaxial stretching can be effected 3- to 8-fold in the longitudinal direction and 3- to 12-fold in the transverse direction.

Post-stretching annealing at a high temperature using heating rolls is optionally available to effect heat setting.

The total thickness of the support of the present invention is adjusted, for example, to about 30 to 300 μm, and more preferably to about 40 to 150 μm. The thickness of the surface layer (A) is preferably 1.5 m or above. In view of obtaining an enhanced glossiness, the thickness of the surface layer (A) is preferably adjusted to 2 to 10 μm. In particular, the thickness of the surface layer (A) is preferably adjusted to less than 15%, more preferably 2 to 14%, of the total thickness of the support. The thickness of the surface layer (A) equals to or more than 15% of the total thickness of the support will reduce the external waviness but will sometimes cause sticking to thereby lower the color density.

In the support of the present invention, three-dimensional center plane average roughness of the surface layer (A) must be about 0.3 μm or below, and more preferably about 0.05 to 0.2 μm. Smaller three-dimensional center plane average roughness of the surface layer (A) can yield a larger amount of reflected light, which is beneficial in achieving a high glossiness.

The opacity of the support of the present invention is preferably about 70% or more. Larger opacity can emphasize contrast of an image and can provide attractive visual impression. Some applications may, however, prefer translucency (in an opacity of about 40 to 65%), so that it is recommendable to properly adjust the opacity depending on purposes of use.

The porosity of the support is preferably about 20 to 60%, and more preferably about 20 to 55%. The "porosity" in the context of this specification refers to a value obtained from the equation (1) below. In the equation, $r_0$ denotes a true density of the support, and $r_1$ denotes a density of the support (JIS P-8118). Unless otherwise the material before the stretching contains a large volume of air, true density nearly equals to density before the stretching. The density of the support of the present invention generally is within a range from about 0.55 to 1.20 g/cm$^3$, where a larger amount of micro-voids will result in a smaller density and a larger porosity. In addition, a smaller density of the support will improve contact property of the thermal transfer image-recording material with a thermal head, which raises color density in accordance with the following relationship:

$$\frac{\rho_0 - \rho_1}{\rho_0 \times 100}$$

Thermal Transfer Image-Recording Material

A thermal transfer image-recording material can be provided using the support of the present invention. The thermal transfer image-recording material must be such that fixing thermally transferred color material and thus providing a desirable image. It is thus preferable to determine the constitution of the thermal transfer image-recording material depending on types of the color material. For example, the support provided with a color material of the thermal fusion type can be used per se as a thermal transfer image-recording material. On the other hand, the support provided with a color material of the sublimation and diffusion type preferably has on the support a thermal transfer image-recording layer.

In the fabrication process for the thermal transfer image-recording material having the thermal transfer image-recording layer, a material having an excellent acceptability for a color material to be thermally transferred will be used for such image-recording layer. Acrylic resin and polyolefinic polymers are examples of such material with a high acceptability for a pigment-containing color material of the thermal fusion type. A material showing a high acceptability for a subliming or vaporizing dye can be exemplified as polymers such as polyester, or a material such as activated clay. Specific examples of such material will be listed below.

Exemplary acrylic copolymer resins include those obtained by polymerizing monomers such as dimethylaminoethyl (meth)acrylate, diethylaminoethyl (meth)acrylate, dibutylaminoethyl (meth)acrylate, dimethylaminoethyl (meth)acrylamide, and diethylaminoethyl (meth) acrylamide. Examples of vinyl monomer to be co-polymerized with such monomer include styrene, methyl (meth)acrylate, ethyl (meth)acrylate, n-butyl (meth)acrylate, t-butyl (meth)acrylate, vinyl chloride, ethylene, acrylic acid, methacrylic acid, itaconic acid, acrylonitrile, and methacrylamide. It should now be noted that the descriptions "(meth)acrylate" and "(meth)acrylamide" individually mean methacrylate or acrylate, and acrylamide or methacrylamide.

For the thermal transfer image-recording layer of the thermal transfer image-recording material according to the present invention may contain a mixture of an acrylic copolymer resin, an amino compound and an epoxy compound. The acrylic copolymer resin can be selected from those described above. Examples of the amino compound include polyalkylene polyamine, such as diethylene triamine and triethylene tetracumine; polyethylene imine; ethylene urea; epiclorohydrin adduct of polyamine polyamide (e.g., Kaimen-557H from Dick Hercules Corporation, AF-100 from Arakawa Rinsan Kogyo K.K.); and aromatic glycidyl ether or ester adduct of polyamine polyamide (e.g., Sunmide 352, 351 and X-2300-75 from Sanwa Kagaku K.K., Epicure 3255 from Shell Chemical, Co., Ltd.). Examples of the epoxy compound include diglycidyl ether of bisphenol-A, diglycidyl ether of bisphenol-F, phthalic acid diglycidyl ester, polypropylene glycol diglycidyl ester, and trimethylolpropane triglycidyl ether.

The above acrylic copolymer resin, or the mixture of acrylic copolymer resin, amino compound and epoxy compound may farther be added with an inorganic or organic fine powder to thereby compose a thermal transfer image-recording layer. Examples of available inorganic fine powder include synthetic silica such as white carbon, calcium carbonate, clay, talc, aluminum sulfate, titanium dioxide and zinc sulfate, all of which having an average grain size of about 0.5 μm or less. Among these, synthetic silica such as white carbon or precipitated calcium carbonate, both of which having an average grain size of about 0.2 μm or below can preferably be used.

The organic fine powder may be of a variety of species, where those having an average grain size of about 10 μm or below are preferable. Examples of polymer composing such organic fine powder include methyl cellulose, ethyl cellulose, polystyrene, polyurethane, urea-formalin resin, melamine resin, phenol resin, iso-(or diiso-)butylene-maleic anhydride copolymer, styrene-maleic anhydride copolymer, polyvinyl acetate, polyvinyl chloride, vinyl chloride-vinyl acetate copolymer, polyester, polyacrylate, polymethacrylate, styrene-butadiene-acrylic copolymer.

Such inorganic or organic fine powder is generally used in an amount of about 30 wt % or below. In particular, the inorganic fine powder is preferably surface-treated with a nonionic, cationic or amphoteric active agent such as turkey red oil, sodium dodecyl sulfate, organic amine, and metal soap sodium lignin sulfonate. Such treatment will successfully improve ink wettability of the thermal transfer image-recording layer, and thus upgrade functions of such thermal transfer image-recording material.

The thermal transfer image-recording layer can also contain a mixed resin of a saturated polyester and a vinyl chloride-vinyl acetate copolymer. Commercially available saturated polyesters include Vylon 200, Vylon 290, Vylon 600 (products of Toyobo Co., Ltd.); KA-1038C (product of Arakawa Kagaku Kogyo K.K.); and TP 220, TP 235 (products of The Nippon Synthetic Chemical Industry, Ltd.). The vinyl chloride-vinyl acetate copolymer preferably has a vinyl chloride content of 85 to 97 wt % and a degree of polymerization of approx. 200 to 800. It is not always necessary for the vinyl chloride-vinyl acetate copolymer to be composed only of vinyl chloride and vinyl acetate monomers, and the copolymer may also contain vinyl alcohol, maleic acid or other monomers. Commercially available vinyl chloride-vinyl acetate copolymers include Ethleck A, Ethleck C, Ethleck M (products of Sekisui Chemical Co., Ltd.); Vinylite VAGH, Vinylite VYHH, Vinylite VMCH, Vinylite VYHD, Vinylite VYLF, Vinylite VYNS, Vinylite VMCC, Vinylite VMCA, Vinylite VAGD, Vinylite VERR, Vinylite VROH (products of Union Carbide Corporation); and Denkavinyl 1000GKT, Denkavinyl 1000L, Denkavinyl 1000CK, Denkavinyl 1000A, Denkavinyl 1000LK2, Denkavinyl 1000AS, Denkavinyl 1000MT2, Denkavinyl 1000CSK, Denkavinyl 1000CS, Denkavinyl 1000GK, Denkavinyl 1000GSK, Denkavinyl 1000GS, Denkavinyl 1000LT2, Denkavinyl 1000D, Denkavinyl 1000W (products of Denki Kagaku Kogyo K.K.). The preferable mixing ratio of the saturated polyester and the vinyl chloride-vinyl acetate copolymer relates to 100 to 900 weight parts of the former per 100 weight parts of the latter.

The thermal transfer image-recording material can be fabricated by coating and drying processes on the side of the support having the surface layer (A). Methods for the coating are not specifically limited and can be practiced using an ordinary coating apparatus such as a blade coater, air knife coater, roll coater and bar coater; or other apparatuses such as a size press and gate roll apparatus.

The thickness of the thermal transfer image-recording layer is about 0.2 to 20 μm in general, and more preferably about 0.5 to 10 μm.

The thermal transfer image-recording material can optionally be subjected to calender processing to further smoothen the surface of the thermal transfer image-recording layer 6. It is also acceptable to form an overcoat layer on the thermal transfer image-recording layer 6.

The form of the thermal transfer image-recording material is not specifically limited. While the material is generally provided in a sheet form, also a form of a tape or a thick board is also allowable depending on purposes and conditions of use.

The present invention will now be further described by reference to certain examples which are provided solely for purposes of illustration and are not intended to be limitative.

EXAMPLES 1 to 8

Comparative Example 1

A material (A) composed of a propylene homopolymer having a melt flow rate (MFR: at 230° C. and under 2.16 kg load) of 4 g//10 min. (a product of Nihon Polychem Co., Ltd.); a composition (B) composed of a propylene homopolymer having an MFR (230° C., 2.16 kg load) of 0.8 g//10 min. (a product of Nihon Polychem Co., Ltd.), a high-density polyethylene (a product of Nihon Polychem Co., Ltd.) and heavy calcium carbonate; and a composition (C) composed of a propylene homopolymer used for the material (A) and heavy calcium carbonate were separately kneaded under fusion in three extrusion machines. The melts were then fed to a single co-extrusion die, stacked within such die, extruded into a sheet form, and then cooled to approx. 60EC to thereby obtain a stacked material.

The stacked material is re-heated up to 145° C. and stretched five-fold in the longitudinal direction effected by difference in the peripheral speeds of a number of roller groups; and then heated up to 150° C. and stretched 8.5-fold in the transverse direction using a tenter. The stack was further annealed at 160° C., cooled down to 60° C., and having the both edge portions slit off, to thereby obtain a support comprising a multi-layered synthetic paper.

With regard to Examples 1 to 8 and Comparative Example 1, contents of the constituents of the compositions (B) and (C) used for fabricating the supports, types of heavy calcium carbonate and the thickness of the individual layers of the supports were selected as listed in Table 1. In Example 8, a composition (A1) composed of a propylene homopolymer and a composition (A2) composed of 95 wt % of a propylene homopolymer and 5 wt % of titanium oxide were prepared in place of the foregoing composition (A), to thereby finally obtain a four-layered support having a constitution of (A1)/(A2)/(B)/(C)=1.5 μm/1.5 μm/54 μm/3 μm. A support obtained in Comparative Example 1 was the same as that obtained by a method described in Laid-Open Japanese Patent Publication 7-76186.

EXAMPLE 9

A propylene homopolymer (A) having an MFR of 4 g//10 min. was kneaded under fusion at 250° C. using an extrusion machine, cooled to approx. 60° C. using a cooling roll, heated to 145° C., and then stretched 5-fold in the longitudinal direction. The sheet was then stretched 8.5-fold in the transverse direction at 162° C. using a tenter. Both edge portions of the film were slit off to thereby obtain a film (A) of 15 μm thick.

Separately, a composition (B) composed of a mixture of 65 wt % of a propylene homopolymer having an MFR of 4 g//10 min, 10 wt % of high-density polyethylene, and 25% of heavy calcium carbonate (a) was kneaded under fusion at 250° C. using an extrusion machine, cooled to approx. 60° C. using a cooling roll. The obtained sheet was then heated to 145° C., stretched 5-fold in the longitudinal direction, and was then stretched 8.5-fold at 152° C. using a tenter. Both edge portions of the film were slit off to thereby obtain a film (B) of 115 μm thick.

The films (A) and (B) were then adhered using a polyether polyol/polyisocyanate adhesive, to thereby obtain a support having a constitution of (A)/adhesive layer/(B)=15 μm/1 μm/115 μm.

EXAMPLE 10

On the front and back surfaces of a wood free paper of 60 μm thick, the supports obtained in Example 2 were individually adhered using a polyether polyol/polyisocyanate adhesive so that the individual surface layers (A) appear to the outermost, to thereby obtain a support having a constitution of (A)/(B)/(C)/wood free paper/(C)/(B)/(A).

EXAMPLE 11

A support was obtained similarly to Example 10 except that using a white polyester film having a density of 0.88 g/cm³ in place of the wood free paper.

EXAMPLE 12

On the front and back surfaces of a wood free paper of 60 μm thick, the supports obtained in Example 7 were individually adhered using a polyether polyol/polyisocyanate adhesive, to thereby obtain a support having a constitution of (A)/(B)/(C)/wood free paper/(A)/(B)/(C).

EXAMPLES 13 to 19

Comparative Example 2

A material (A) composed of a polypropylene homopolymer having an MFR (230° C., 2.16 kg load) of 4 g//10 min. (a product of Nihon Polychem Co., Ltd.) and rutile-type titanium dioxide having an average grain size of 0.2 μm; a composition (B) composed of a propylene homopolymer having an MFR (230° C., 2.16 kg load) of 0.8 g//10 min. (a product of Nihon Polychem Co., Ltd.), a high-density polyethylene (a product of Nihon Polychem Co., Ltd.) and heavy calcium carbonate; and a composition (C) composed of a propylene homopolymer used for the material (A) and heavy calcium carbonate were separately kneaded under fusion in three extrusion machines. The melts were then fed to a single co-extrusion die, stacked within such die, extruded into a sheet form, and then cooled to approx. 60° C. to thereby obtain a stacked material.

The stacked material is re-heated up to 145° C. and stretched 5-fold in the longitudinal direction effected by difference in the peripheral speeds of a number of roller groups; and then heated up to 150° C. and stretched 8.5-fold in the transverse direction using a tenter. The stack was further annealed at 160° C., cooled down to 60° C., and having the both edge portions slit off, to thereby obtain a support comprising a multi-layered synthetic paper.

With regard to Examples 13 to 19 and Comparative Example 2, contents of the constituents of the material (A) and the compositions (B) and (C) used for fabricating the supports, types of heavy calcium carbonate and the thickness of the individual layers of the supports were selected as listed in Table 2. A support obtained in Comparative Example 2 was the same as that obtained by a method described in Example 1 of Laid-Open Japanese Patent Publication 7-179078.

Test Example 1

With regard to the individual supports obtained in Examples 1 to 9 and Comparative Example 1, the three-dimensional center plane average roughness (SRa) of the surface layer (A) was measured using a three-dimensional surface roughness meter Model SE-3AK (a product of Kosaka Laboratory Ltd.) and an analyzer Model SPA-11 (a product of Kosaka Laboratory Ltd.). Sixty degrees surface glossiness and 75 degrees surface glossiness were measured using a measuring instrument Model UGV-50 (a product of Suga Test Instruments Co., Ltd.), where the measurement was carried out according to JIS P-8142 except that partially modifying the incident angle from 75 degrees to 60 degrees. The opacity, density (JIS P-8118) and porosity were also measured. Results of the measurements were summarized in Table 1.

With regard to the individual supports obtained in Examples 13 to 19 and Comparative Example 2, the three-dimensional center plane average roughness (SRa) of the surface layer (A) was similarly measured. Twenty degrees surface glossiness and 75 degrees surface glossiness were measured using a measuring instrument Model UGV-50 (a product of Suga Test Instruments Co., Ltd.), where the measurement was carried out according to JIS P-8142 except that partially modifying the incident angle from 75 degrees to 20 degrees. The opacity, density (JIS P-8118) and porosity were also measured. Results of the measurements were summarized in Table 2.

TABLE 1

| | Base Layer (B) | | | Back Layer (C) | | A/B/C | A/total thickness | Physical Properties of the Support | | | | | |
| | | | | | | | | SRa | Surface Glossiness | | Opacity | Density | Porosity |
| | PP | HDPE | CaCO₃ | PP | CaCO₃ | (μm) | (%) | (μm) | 60E | 75E | (%) | (g/cm³) | (%) |
|---|---|---|---|---|---|---|---|---|---|---|---|---|---|
| Example 1 | 80 | 10 | (a) 10 | 100 | — | 3/56/1 | 5 | 0.10 | 110 | 113 | 85 | 0.68 | 29 |
| Example 2 | 65 | 10 | (a) 25 | 100 | — | 3/56/1 | 5 | 0.12 | 102 | 105 | 85 | 0.67 | 30 |
| Example 3 | 65 | 10 | (a) 25 | 100 | — | 7/52/1 | 12 | 0.11 | 113 | 116 | 84 | 0.70 | 26 |
| Example 4 | 65 | 10 | (b) 25 | 100 | — | 3/56/1 | 5 | 0.15 | 94 | 103 | 82 | 0.74 | 23 |
| Example 5 | 65 | 10 | (c) 25 | 100 | — | 3/56/1 | 5 | 0.17 | 93 | 101 | 80 | 0.76 | 21 |
| Example 6 | 65 | 10 | (d) 25 | 100 | — | 3/56/1 | 5 | 0.09 | 113 | 117 | 84 | 0.67 | 30 |
| Example 7 | 65 | 10 | (a) 25 | 60 | (e) 40 | 3/56/1 | 5 | 0.10 | 101 | 105 | 85 | 0.67 | 30 |
| Example 8 | 65 | 10 | (a) 25 | 100 | — | 3/54/3 | 5 | 0.11 | 111 | 114 | 88 | 0.69 | 29 |
| Example 9 | | | | | See the text | | | 0.08 | 113 | 110 | 81 | 0.77 | 20 |
| Comparative Example 1 | 65 | 10 | (e) 25 | 100 | — | 3/54/3 | 5 | 0.42 | 72 | 93 | 84 | 0.72 | 24 |

PP: propylene homopolymer
HDPE: high-density polyethylene
types of CaCO₃:
(a) heavy calcium carbonate; average grain size = 0.93 μm, specific surface area = 25,000 cm²/g, including no grains with a grain size of 5 μm or above
(b) heavy calcium carbonate; average grain size = 0.80 μm, specific surface area = 29,100 cm²/g, including no grains with a grain size of 10 μm or above
(c) heavy calcium carbonate; average grain size = 0.20 μm, specific surface area = 32,500 cm²/g, including no grains with a grain size of 10 μm or above
(d) heavy calcium carbonate; average grain size = 1.24 μm, specific surface area = 24,200 cm²/g, including no grains with a grain size of 3 μm or above
(e) heavy calcium carbonate; average grain size = 1.5 μm

TABLE 2

| | Surface Layer (A) | | Base Layer (B) | | | Back Layer (C) | | Thickness of the Layers | | Physical Properties of the Support | | | | | |
|---|---|---|---|---|---|---|---|---|---|---|---|---|---|---|---|
| | | | | | | | | A/B/C | A/total thickness | SrA | Surface Glossiness | | Density | Porosity | White- |
| | PP | TiO₂ | PP | HDPE | CaCO₃ | PP | CaCO₃ | (μm) | (%) | (μm) | 60E | 75E | (%) | (%) | ness (%) |
| Example 13 | 99 | 1 | 65 | 10 | (a) 25 | 100 | — | 3/56/1 | 5 | 0.09 | 63 | 109 | 0.66 | 40 | 96 |
| Example 14 | 98 | 2 | 65 | 10 | (a) 25 | 100 | — | 3/56/1 | 5 | 0.1 | 58 | 103 | 0.7 | 36 | 96 |
| Example 15 | 95 | 5 | 65 | 10 | (a) 25 | 100 | — | 3/54/3 | 5 | 0.11 | 51 | 96 | 0.66 | 41 | 97 |
| Example 16 | 98 | 2 | 65 | 10 | (a) 25 | 100 | — | 1.5/57.5/1 | 2.5 | 0.1 | 34 | 105 | 0.72 | 34 | 96 |
| Example 17 | 98 | 2 | 65 | 10 | (a) 25 | 100 | — | 4/56/1 | 6.7 | 0.1 | 60 | 103 | 0.69 | 37 | 96 |
| Example 18 | 98 | 2 | 65 | 10 | (a) 25 | 100 | — | 7/52/1 | 11.7 | 0.13 | 64 | 100 | 0.7 | 36 | 96 |
| Example 19 | 92 | 8 | 65 | 10 | (a) 25 | 100 | — | 3/56/1 | 5 | 0.27 | 42 | 84 | 0.68 | 38 | 98 |
| Comparative Example 2 | 95 | 5 | 65 | 10 | (e) 25 | 100 | — | 3/54/3 | 5 | 0.35 | 16 | 91 | 0.61 | 46 | 96 |

PP: propylene homopolymer
HDPE: high-density polyethylene
types of CaCO₃:
(a) heavy calcium carbonate; average grain size = 0.93 μm, specific surface area = 25,000 cm²/g, including no grains with a grain size of 5 μm or above
(e) heavy calcium carbonate; average grain size = 1.5

Fabrication and Evaluation of Thermal Transfer Image-Recording Material

EXAMPLE 20

On the surface layer (A) of each support obtained in Examples 1 to 19 and Comparative Examples 1 and 2, a thermal transfer image-recording layer having a composition shown below was formed by Mayer bar coating in a dry thickness of 4 μm, and drying at 80° C. seconds.

| Materials | weight parts |
|---|---|
| Saturated polyester | |
| (Vylon 200, Tg = 67EC, a product of Toyobo Co., Ltd.) | 5.3 |
| (Vylon 290, Tg = 77EC, a product of Toyobo Co., Ltd.) | 5.3 |
| Vinyl chloride-vinyl acetate copolymer (Vinylite VYHH, a product of Union Carbide Corporation) | 4.5 |
| Titanium oxide (KA-l0, a product of Titan Kogyo K.K.) | 1.5 |
| Amino-modified silicone oil (KF-393, a product of Shin-Etsu Silicone) | 1.1 |
| Epoxy-modified silicone oil (X-22-343, a product of Shin-Etsu Silicone) | 1.1 |
| Toluene | 30 |
| Methyl ethyl ketone | 30 |
| Cyclohexane | 22 |

Test Example 2

External waviness on the surface of the individual thermal transfer image-recording materials fabricated in Example 20 was evaluated according to the following 5-stage criteria, where a smaller external waviness can be assessed with a larger score:

5: excellent;

4: good;

3: not causative of practical problems;

2: causative of practical problems; and

1: no good.

The surface of such thermal transfer image-recording material is then subjected to printing using an printing apparatus (a product of Okura Electrics, Co., Ltd., dot density=6 dots/mm, applied voltage=13 V) while varying printing pulse width. The printed characters were visually checked for gradation and evaluated according to the following 5-stage criteria:

5: excellent;

4: good;

3: not causative of practical problems;

2: causative of practical problems; and

1: no good.

Figure 3:
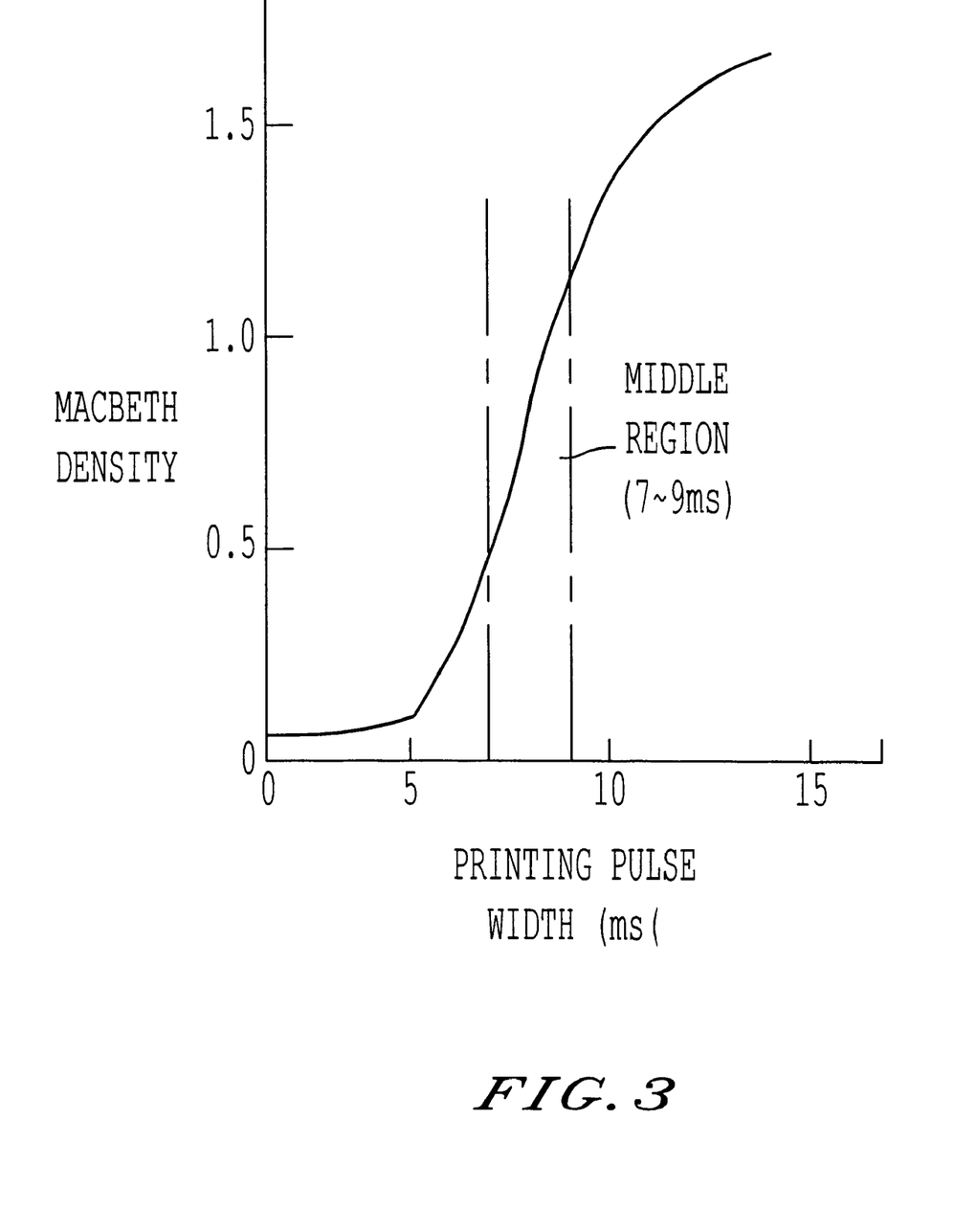
FIG. 3 is a graph for explaining a half tone region in a Macbeth density profile.

The thermal transfer image-recording materials obtained in Examples 13 to 19 and Comparative Example 2 were subjected to printing with a dot density of 6 dots/mm, an applied voltage of 13 V and a printing pulse width of 8 ms, and Macbeth density in the middle region within the pulse width (FIG. 3) was measured.

Results were summarized in Table 3.

TABLE 3

| | External waviness | Gradation | Macbeth density in half-tone region (pulse width = 8 ms) |
|---|---|---|---|
| Example 1 | 5 | 5 | — |
| Example 2 | 4 | 5 | — |
| Example 3 | 5 | 5 | — |
| Example 4 | 4 | 4 | — |
| Example 5 | 4 | 4 | — |
| Example 6 | 5 | 5 | — |
| Example 7 | 5 | 5 | — |
| Example 8 | 5 | 5 | — |
| Example 9 | 5 | 4 | — |
| Example 10 | 4 | 5 | — |
| Example 11 | 4 | 5 | — |
| Example 12 | 4 | 5 | — |
| Comparative Example 1 | 3 | 4 | — |
| Example 13 | 5 | 5 | 0.84 |
| Example 14 | 5 | 5 | 0.85 |
| Example 15 | 5 | 5 | 0.87 |
| Example 16 | 5 | 5 | 0.84 |
| Example 17 | 5 | 5 | 0.83 |
| Example 18 | 5 | 5 | 0.81 |

TABLE 3-continued

|  | External waviness | Gradation | Macbeth density in half-tone region (pulse width = 8 ms) |
|---|---|---|---|
| Example 19 | 5 | 5 | 0.89 |
| Comparative Example 2 | 3 | 5 | 0.85 |

The present invention, thus, provides a thermal transfer image-recording material having an excellent glossiness, no external waviness and capable of producing a clear image can be obtained by employing a support comprising a base layer (B) composed of a biaxially stretched film of a thermoplastic resin containing an inorganic fine powder; and a surface layer (A) provided at least on one side of the base layer (B), which is composed of a biaxially stretched film of a thermoplastic resin having a three dimensional center plane average roughness of about 0.3 μm or below and a 60 degrees surface glossiness of about 80% or above. In particular, a thermal transfer image-recording material having a high color density in the half tone region and capable of producing a clear image with higher sensitivity can be obtained if the support comprises a biaxially stretched film of a thermoplastic resin containing titanium dioxide fine powder having a three-dimensional center plane average roughness (SRa) of about 0.3 μm or below, and a 20 degrees surface glossiness of about 30% or above.

Having described the present invention, it will be apparent to one of ordinary skill in the art that many changes and modifications can be made thereto without departing from the spirit or scope of the invention as set forth herein.

What is claimed is:

1. A support, comprising:
   a) a base layer (B) comprising of a biaxially stretched film of a thermoplastic resin containing an inorganic powder; and
   b) a surface layer (A) provided at least on one side of said base layer (B), which is composed of a biaxially stretched film of a thermoplastic resin having a three dimensional center plane average roughness of about 0.3 μm or below and a 60 degrees surface glossiness of about 80% or above.

2. The support of claim 1, wherein said surface layer (A) comprises a biaxially stretched film of a thermoplastic resin having a three-dimensional center plane average roughness of about 0.3 μm or below and a 20 degrees surface glossiness of about 30% or above.

3. The support of claim 1, wherein said three-dimensional center plane average roughness is within a range from of about 0.05 to 0.2 μm.

4. The support of claim 1, wherein said surface layer (A) comprises about 1 to 10 wt % of titanium dioxide powder.

5. The support of claim 4, wherein said titanium dioxide powder has a rutile structure.

6. The support of claim 4, wherein said titanium dioxide powder has an average grain size about of 0.5 μm or below.

7. The support of claim 1, wherein said base layer (B) comprises a biaxially stretched film of thermoplastic resin containing about 5 to 45 wt % of an inorganic powder.

8. The support of claim 1, wherein said inorganic powder of said base layer (B) has an average grain size of about 3 μm or below.

9. The support of claim 8, wherein said inorganic powder comprises calcium carbonate, fired clay, diatomaceous earth, talc, titanium oxide, barium sulfate, aluminum sulfate or silica.

10. The support of claim 1, wherein said inorganic powder is calcium carbonate powder having a specific surface area of about 20,000 $cm^2/g$ or above, and excluding grains with a grain size of about 10 μm or above.

11. The support of claim 1, wherein said thermoplastic resin of both said base layer (B) and said surface layer (A) is a polyolefin-base resin.

12. The support of claim 11, wherein said polyolefin-base resin is at least one selected from the group consisting of propylene homopolymer, ethylene-propylene random copolymer, and ethylene-propylene-1-butene random copolymer.

13. The support of claim 12, wherein said ethylene-propylene random copolymer has an ethylene content of 0.5 to 8 wt %.

14. The support of claim 12, wherein said ethylene-propylene-1-butene random copolymer has an ethylene content of 0.5 to 8 wt %, a 1-butene content of 4 to 12 wt % and a propylene content of 80 to 95.5 wt %.

15. The support of claim 1, further comprising a back layer (C) provided on said base layer (B) on the side opposite to said surface layer (A).

16. The support of claim 15, wherein said back layer comprises pulp paper, or transparent or white opaque polyethylene terephthalate film.

17. The support of claim 1, obtained by biaxially stretching a stacked material composed of at least said base layer (B) and said surface layer (A) stacked thereon.

18. The support of claim 1, wherein a stretching factor of said biaxial stretching is 3- to 8-fold in the longitudinal direction and 3- to 12-fold in the transverse direction.

19. The support of claim 1, having a total thickness of about 30 to 300 μm.

20. The support of claim 1, wherein said surface layer (A) has a thickness of 1.5 μm or above.

21. The support of claim 1, wherein the thickness of said surface layer (A) is less than about 15% of the total thickness of the support.

22. The support of claim 1, having a porosity of about 20 to 60%.

23. The support of claim 1, wherein said thermoplastic resin of said base layer (B) and said surface layer (A) are different.

24. The support of claim 1, wherein said thermoplastic resin of said base layer (B) and said surface layer (A) are the same.

25. The support of claim 1, wherein said thermoplastic resin of said surface layer (A) comprises two or more thermoplastic resins.

26. The support of claim 1, wherein said thermoplastic resin of said base layer (B) comprises two or more thermoplastic resins.

27. The support of claim 1, having a structure, which comprises in order surface layer (A)/base layer (B), back layer (C)/backing layer/back layer (C)/base layer (B)/surface layer (A).

28. The support of claim 27 further comprising an adhesive layer imposed between any layers.

29. The support of claim 1, having a structure, which comprises, in order surface layer (A)/base layer (B)/back layer (C)/backing layer/surface layer (A)/base layer (B)/back layer (C).

30. The support of claim 29 further comprising an adhesive layer imposed between any layers.

31. The support of claim 1, having a structure, which comprises in order a first surface layer (A1), a second surface layer (A2), base layer (B)/back layer (C).

32. The support of claim 1, having a structure which comprises in order surface layer (A)/base layer (B)/back layer (C)/wood free paper/surface layer (A)/base layer (B)/back layer (C).

33. A thermal transfer image-recording material, comprising the support as claimed in claim 1.

34. A thermal transfer image-recording material, comprising the support of claim 1, and having a thermal transfer image-recording layer on said surface layer (A).

35. A method of producing an image by thermal transfer recording, which comprises producing an image with the thermal transfer image-recording material of claim 34.

* * * * *